United States Patent
Ohnishi

(10) Patent No.: US 7,693,393 B2
(45) Date of Patent: Apr. 6, 2010

(54) IMAGE RECORDING APPARATUS AND IMAGE CAPTURE APPARATUS

(75) Inventor: Shinji Ohnishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 11/318,150

(22) Filed: Dec. 23, 2005

(65) Prior Publication Data

US 2006/0140578 A1    Jun. 29, 2006

(30) Foreign Application Priority Data

Dec. 28, 2004    (JP) .............................. 2004-381605

(51) Int. Cl.
  *H04N 5/94*    (2006.01)
  *H04N 7/64*    (2006.01)
(52) U.S. Cl. ........................ 386/47; 386/113
(58) Field of Classification Search .................. 386/47, 386/46, 76, 113, 114
  See application file for complete search history.

(56) References Cited

U.S. PATENT DOCUMENTS 4,829,388 A    5/1989  Nakayama et al.

2002/0183873 A1 * 12/2002  Miura et al. ................. 700/94
2004/0146274 A1    7/2004  Ishibashi

FOREIGN PATENT DOCUMENTS

| CN | 1527308 A | 9/2004 |
| EP | 256380 A | 2/1988 |
| JP | 2003-259275 | 9/2003 |
| JP | 2004-213709 A | 7/2004 |

OTHER PUBLICATIONS

The above reference were cited in on Aug. 8, 2008 Chinese Office Action that issued in Chinese Patent Application 2005-10135408.0, a English Translation.
The above references were cited in a Sep. 1, 2009 Japanese Office Action that issued in Japanese Patent Application No. 2004-381605, a copy of which is enclosed with English Translation.

* cited by examiner

*Primary Examiner*—Robert Chevalier
(74) *Attorney, Agent, or Firm*—Cowan, Liebowitz & Latman, P.C.

(57) ABSTRACT

An image recording apparatus (e.g., a hard disk and so on) comprises (a) a recording unit adapted to record moving image data from an external device (e.g., a video camera and so on) on a recording medium; (b) a detection unit adapted to detect an occurrence of a dropout which occurs when the moving image data is recorded onto the recording medium; and (c) a transmitting unit adapted to transmit control data for notifying the presence and absence of a dropout to the external device.

4 Claims, 6 Drawing Sheets

FIG. 4
| | COMMAND FORMAT | | | | | | | |
|---|---|---|---|---|---|---|---|---|
| | MSB | | | | | | | LSB |
| opcode | DROP INFO (XX₁₆) | | | | | | | |
| operand[0] | DROP FLAG | | | | | | | |
| operand[1] | DROP COUNT | | | | | | | |
FIG. 5
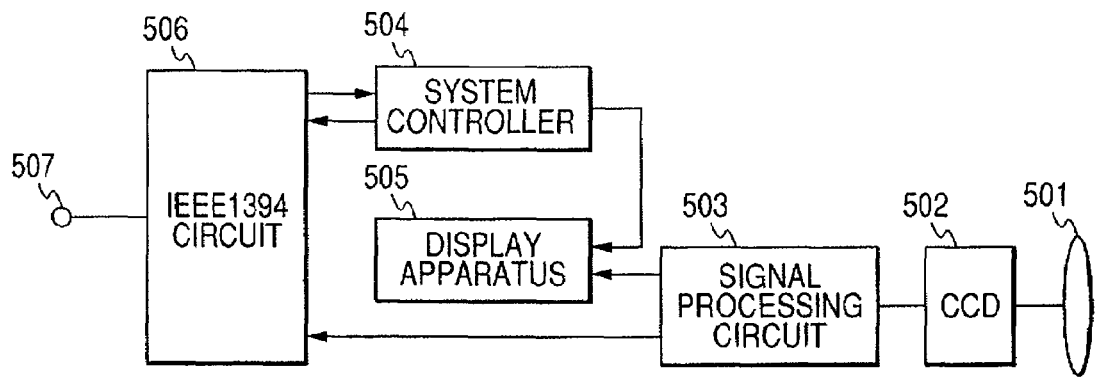
FIG. 6
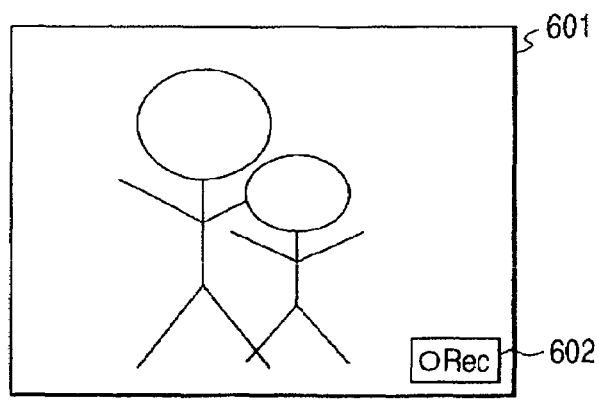

IMAGE RECORDING APPARATUS AND IMAGE CAPTURE APPARATUS

BACKGROUND OF THE INVENTION

1. Field of the Invention

The present invention relates to an image capture apparatus (e.g., a video camera and so on), and an image recording apparatus (e.g., a hard disk and so on) which records moving image data outputted from the image capture apparatus.

2. Related Background Art

According to prior art, when a video camera digitally records a video signal and an audio signal, the recording is often performed by use of a DV tape, which is a magnetic tape. In the case where signals are recorded onto a DV tape, when an edit is performed, it is needed to connect via a cable the IEEE 1394 terminals included in the video camera and an edit device, such as a personal computer, and to transfer data from the DV tape to the edit device. To transfer data, it is needed to perform reproduction of the DV tape; for example, when 60 minutes of video and audio are recorded onto the DV tape, reproduction is performed for 60 minutes to transfer data to the edit device.

To avoid the data transfer time described above, there has been known a technique for directly recording video and audio signals onto a high-speed and random accessible medium, such as a hard disk drive, at the time of capturing the signals by a video camera (refer to Japanese Patent Application Laid-Open No. 2002-232821, for example). For example, when the IEEE 1394 terminals of a video camera and a note-type personal computer are connected to each other via a cable and video and audio signals captured by the video camera are directly recorded onto a hard disk drive of the personal computer, an edit operation can be started without transferring data after completion of the capturing.

However, in recording signals onto the hard disk, when software running on the personal computer accesses the hard disk for read and write, there can occur a period in which data from the video camera cannot be recorded, and the photographer does not have any means for knowing whether or not the video and audio signals have been correctly recorded on the hard disk of the personal computer.

SUMMARY OF THE INVENTION

The present invention is to overcome the above-described drawbacks.

Another object of the present invention is, for example, to notify the photographer that there has occurred a period in which video and audio signals cannot be recorded, when recording the video and audio signals onto an image recording apparatus (e.g., a hard disk and so on) connected to an image capture apparatus (e.g., a video camera and so on), and further to allow for easily searching for a section in which recording has failed.

According to an aspect of the present invention, an image recording apparatus comprises: a recording unit adapted to record moving image data from an external device on a recording medium; a detection unit adapted to detect a dropout which occurs when the moving image data is recorded onto the recording medium; and a transmitting unit adapted to transmit control data for notifying the presence and absence of a dropout to the external device.

According to another aspect of the present invention, an image capture apparatus which transmits moving image data to an external device, comprises: a receiving unit adapted to receive from the external device, control data for notifying a dropout which occurs when moving image data is recorded onto a recording medium of the external device; and a displaying unit adapted to display information indicating the dropout when the control data is received.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 4 is a view showing an exemplary command frame of DROP INFO command;

FIG. 5 is a block diagram showing a configuration of an image capture apparatus according to the first embodiment;

FIG. 6 is a view showing an exemplary display in a display apparatus included in the image capture apparatus;

DETAILED DESCRIPTION OF THE PREFERRED EMBODIMENTS

Preferred embodiments of the present invention will be described in detail below with reference to the drawings.

First Embodiment

Figure 1:
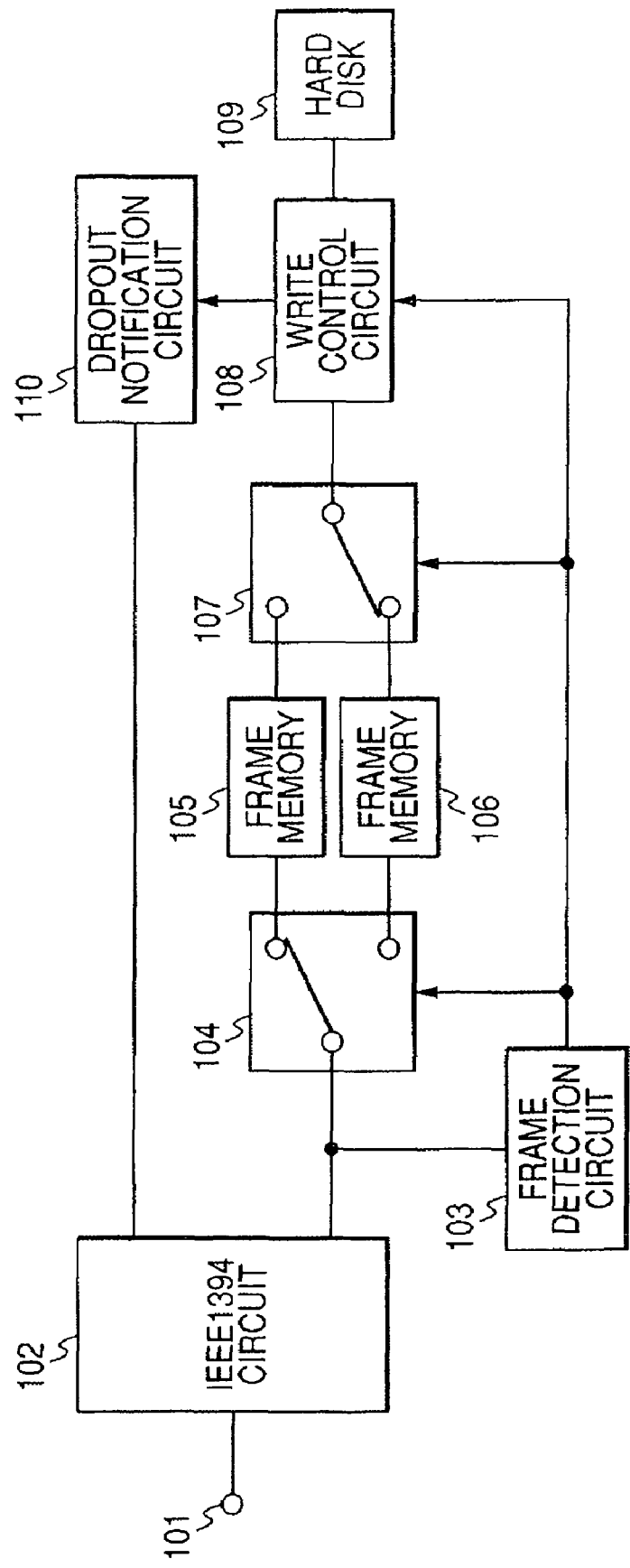
FIG. 1 is a block diagram showing a configuration of an image recording apparatus according to a first embodiment.

FIG. 1 is a block diagram showing a configuration of an image recording apparatus according to a first embodiment of the present invention. Reference numeral 101 denotes an input/output terminal of digital signal. An IEEE 1394 cable is connected to the input/output terminal 101 to transmit/receive signals to/from an external device. Reference numeral 102 denotes an IEEE 1394 circuit. The IEEE 1394 circuit 102 processes a signal received from the input/output terminal 101 and a signal outputted from the image recording apparatus.

Reference numeral 103 denotes a frame detection circuit. The frame detection circuit 103 receives from the IEEE 1394 circuit 102, moving image data and audio data supplied from an external device connected via the input/output terminal 101, and detects the starting data of a moving image data frame from the supplied data, and controls according to the detection result a switch 104, a switch 107 and a write control circuit 108 described later.

Reference numeral 104 denotes a switch. The switch 104 selects an output destination of the moving image data and audio data received from the IEEE 1394 circuit 102 from among a rear-stage frame memory 105 and frame memory 106. The switch 104 is controlled by the frame detection circuit 103, so that when the starting data of a frame is detected, a selection is made by the switch 104.

Reference numerals 105 and 106 denote a frame memory for storing one frame of image data and audio data. By the control of the switch 104 by the frame detection circuit 103, moving image data and audio data supplied to the input/output terminal 101 are stored one after the other on the frame basis into any one of the memories. Specifically, the moving image data and audio data are stored one after the other in such a way that firstly received frame data is stored into the frame memory 105 and secondly received frame data into the frame memory 106 and thirdly received frame data into the frame memory 105.

Reference numeral 107 denotes a switch. The switch 107 selects frame data to be outputted to a rear-stage write control circuit 108 from among frame data stored in the frame memory 105 and frame memory 106. The switch 107 is controlled by the above frame detection circuit 103, so that the frame memory not currently selected by the switch 104 is selected by the switch 107.

Reference numeral 108 denotes a write control circuit. The write control circuit 108 performs various controls for writing, to a rear-stage hard disk 109 as a file, the frame data stored in the frame memory 105 or frame memory 106 connected via the switch 107. Each time the frame detection circuit 103 detects the starting data of a frame, a trigger signal is supplied to the write control circuit 108, and the write control circuit 108 counts up a counter included therein to hold what number of frame from to the start of writing the frame currently written is. When a trigger signal is received, the write control circuit 108 performs a processing of reading via the switch 107, frame data from a frame memory currently selected and writing it onto the hard disk 109.

When the entire frame data stored in the frame memory cannot be written into the hard disk 109 by the time when a subsequent trigger signal is received after reception of a previous trigger signal (hereinafter referred to as a "frame dropout"), the write control circuit 108 outputs a trigger signal to a dropout notification circuit 110. This trigger signal may be immediately outputted in the case of a failure of writing, or may alternatively be outputted according to the presence or absence of a frame dropout, for example, every second. In the case where a trigger signal is outputted every second, when the presence and absence of a frame dropout is detected and it is found that a frame dropout has occurred, a trigger signal is outputted every second starting from the time when a write file is created on the hard disk 109.

The write control circuit 108 has a dropout occurrence flag and a dropout frame counter, and the values of the dropout occurrence flag and dropout frame counter are added to a trigger signal before the trigger signal is outputted. At the time when a recording file is created on the hard disk 109, the write control circuit 108 resets the dropout occurrence flag and dropout frame counter to "zero". When a frame dropout occurs during the writing of data into the file created on the hard disk 109, the write control circuit 108 sets the dropout occurrence flag to "1". Also, when a frame dropout occurs, the dropout frame counter is counted up by one. At the time when the write control circuit 108 outputs a trigger signal to the dropout notification circuit 110, the frame counter is reset to "zero".

The write control circuit 108 has a buffer for holding frame dropout information, which holds the frame number in a file in which a frame dropout has occurred. When completing the recording of a file onto the hard disk 109, the information indicating the dropout position is recorded into the header or footer area of the file as additional information.

Reference numeral 110 denotes a dropout notification circuit. The dropout notification circuit 110 generates according to a trigger signal supplied from the write control circuit 108, packet data for notifying the occurrence of a dropout to the image capture apparatus, which is an input source of moving image data and audio data connected to the input/output terminal 101, and outputs the packet data to the IEEE 1394 circuit 102. The IEEE 1394 circuit 102 transmits the packet supplied from the dropout notification circuit 110 to the image capture apparatus.

Figure 2:
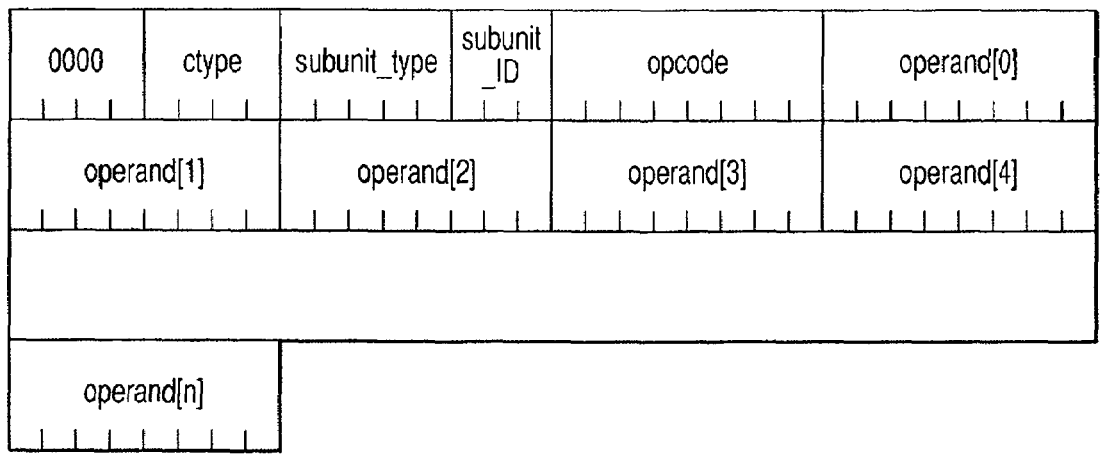
FIG. 2 is a view showing a command frame format used in CTS.

The data for notifying a frame dropout, transmitted to the image capture apparatus connected to the input/output terminal 101 will now be described with reference to FIGS. 2 to 4. As a standard for controlling an AV device by use of IEEE 1394, AV/C unit and AV/C subunit are defined by the 1394 Trade Association (a standard-setting organization) (TA Document 1998003, AV/C Digital Interface Command Set General Specification). A unit means the entire device such as a video camera or a video deck. A subunit means a functionally classified logical control unit, such as a Tape recorder/player, a Video Camera or a Tuner in the device. Transaction is performed via IEEE 1394 interface between a unit or subunit described above and a controller such as a personal computer, whereby the controller can control the subunit or acquire information held by the subunit.

This transaction, which is defined as FCP (Function Control Protocol) in IEC-61883-1, Consumer audio/video equipment—Digital interface—Part 1: General, is implemented in such a way that the controller writes command data into a specific address of the target device by use of write transaction and the target which receives data of write transaction writes response data into a specific address of the controller by use of write transaction.

In the AV/C protocol, CTS (Command Transaction Set) is defined with respect to each AV/C subunit. FIG. 2 shows the format of a command frame used in CTS. The ctype field, indicating a kind of command, specifies a command type shown in Table 1. The subunit_type and subunit ID fields indicate what unit within a specified node the command relates to. The opcode and operand fields indicate the actual content of the command.

TABLE 1

| VALUE | COMMAND TYPE | EXPLANATION |
|---|---|---|
| $0_{16}$ | CONTROL | CONTROL COMMAND |
| $1_{16}$ | STATUS | INQUIRY OF DEVICE STATE |
| $2_{16}$ | SPECIFIC INQUIRY | INQUIRY OF SUPPORT OF THIS COMMAND (INCLUDING OPCODE) |
| $3_{16}$ | NOTIFY | NOTIFICATION OF CHANGE OF DEVICE STATE |
| $4_{16}$ | GENERAL INQUIRY | INQUIRY OF SUPPORT OF THIS COMMAND (NOT INCLUDING OPCODE) |

Figure 3:
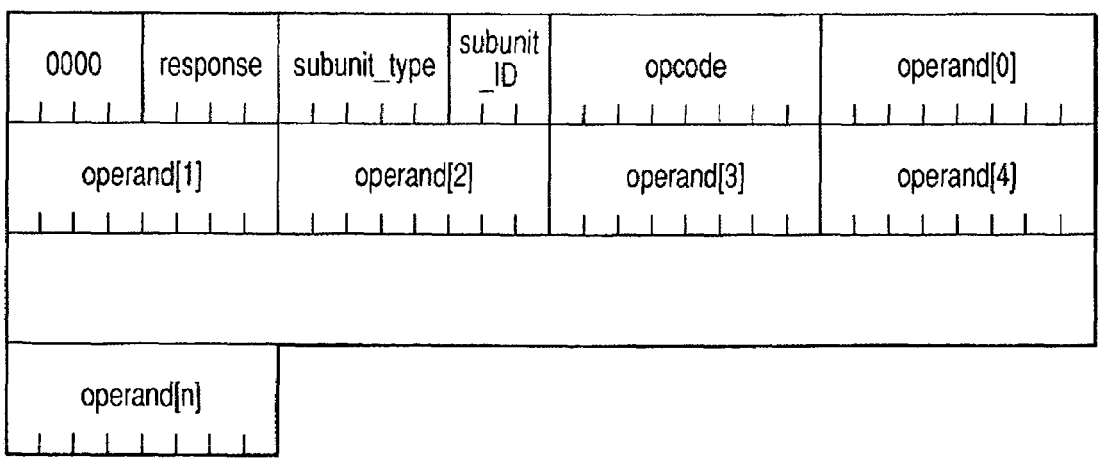
FIG. 3 is a view showing a response frame format used in CTS.

FIG. 3 shows the format of a response frame used in CTS. The response field, indicating a kind of response, specifies a response type shown in Table 2. The subunit_type and subunit ID fields indicate what subunit within a node the response comes from. The opcode and operand fields specify response data.

TABLE 2

| VALUE | RESPONSE CODE | EXPLANATION |
| --- | --- | --- |
| $8_{16}$ | NOT IMPLEMENTED | NOT SUPPORTED BY THIS COMMAND |
| $9_{16}$ | ACCEPTED | COMMAND RECEIVED |
| $A_{16}$ | REJECTED | COMMAND REJECTED |
| $B_{16}$ | IN TRANSITION | DEVICE STATE IN TRANSITION |
| $C_{16}$ | IMPLEMENTED/ STABLE | THIS COMMAND IS SUPPORTED (IN CASE OF INQUIRY COMMAND) DEVICE STATE IS STABLE (IN CASE OF STATUS COMMAND) |
| $D_{16}$ | CHANGED | DEVICE STATE CHANGED |
| $F_{16}$ | INTERIM | COMMAND IS RECEIVED BUT RESPONSE WILL BE RETURNED LATER (IN CASE OF CONTROL COMMAND) WHEN DEVICE STATE IS CHANGED, RESPONSE IS RETURNED (IN CASE OF NOTIFY COMMAND) |

The present embodiment will be described by taking as an example a case where frame dropout information is notified to an AV unit. FIG. 4 shows an exemplary format of the command frame generated by the dropout notification circuit 110. In the DROP INFO field, there is set a code indicating that this command frame is a command for notifying frame dropout information. In the DROP FLAG field, which indicates whether or not a frame dropout has occurred in the file currently written to the hard disk 109, there is set a value of the dropout occurrence flag included in a trigger signal supplied from the write control circuit 108, so that when no dropout has occurred, 00 (hexadecimal) is set, and when a dropout has occurred, 01 (hexadecimal) is set. In the DROP COUNT field, there is set a value of the dropout frame counter included in a trigger signal supplied from the write control circuit 108; that is, there is set the number of dropout frames occurring from transmitting previously a DROP INFO command up to now. After setting the above data, the dropout notification circuit 110 outputs a data packet to the IEEE 1394 circuit 102 to transmit a DROP INFO command to the image capture apparatus connected via the input/output terminal 101.

In the above-described example, a DROP INFO command is outputted at the time when a trigger signal is supplied from the write control circuit, but when no frame dropout occurs, no notification is performed. Accordingly, when no frame dropout occurs, the absence of a dropout may be notified at regular intervals (at intervals of 30 seconds, for example) by holding in the DROP FLAG field the value set at the time of the previous transmission and setting zero to the DROP COUNT field.

The operation of the image capture apparatus (e.g., a video camera and so on) connected to the image recording apparatus will now be described with reference to FIG. 5. FIG. 5 is a block diagram showing a configuration of the image capture apparatus according to the first embodiment having applied thereto the present invention. Reference numeral 501 denotes a lens section. Light inputted through the lens 501 is photoelectrically converted by a CCD 502 and then supplied to a signal processing circuit 503. The signal processing circuit 503 converts the received analog signal from analog to digital form, applies an image compression processing to the digital signal, and then outputs it to the IEEE 1394 circuit 506. The IEEE 1394 circuit 506 transmits the video signal received from the signal processing circuit 503 to the image recording apparatus connected to an input/output terminal 507. The signal processing circuit 503 also outputs the video signal received from the CCD 502 to a display apparatus 505, whereby the photographer can confirm the image currently captured by monitoring the image displayed in the display apparatus 505 such as a liquid crystal panel.

A system controller 504 outputs periodically to the IEEE 1394 circuit 506, command data for inquiring the operation state of the image recording apparatus connected via the input/output terminal 507. The IEEE 1394 circuit 506 transmits the command data to the image recording apparatus. Response data with respect to the command data is inputted to the IEEE 1394 circuit 506 via the input/output terminal 507 and then outputted to the system controller 504. According to the content of the response data, the system controller 504 outputs to the display apparatus 505 the image data indicating the operation state of the image recording apparatus (hereinafter referred to as "external device state indicating data"). The display apparatus 505 displays the external device state indication data with being superimposed on the image supplied from the signal processing circuit 503.

FIG. 6 shows an example of video image displayed in the display apparatus 505. Reference numeral 601 denotes a video image displayed on the entire screen of the display apparatus 505. Within the screen, there are displayed the video supplied from the signal processing circuit 503 and the operation state of the image recording apparatus supplied from the system controller 504. Reference numeral 602 denotes a segment where the operation state of the image recording apparatus supplied from the system controller 504 (hereinafter referred to as "external device state indication segment") is displayed. For example, when the image recording apparatus is in the state of recording a video image, a blank circle and "Rec" are displayed; when recording is not being performed, a blank square and "Stop" are displayed.

When the occurrence of a frame dropout in the image recording apparatus is detected through a DROP INFO command transmitted from the image recording apparatus, a display different from the above described one is given, whereby the photographer can confirm whether or not the operation state of the image recording apparatus is normal.

Figure 7:
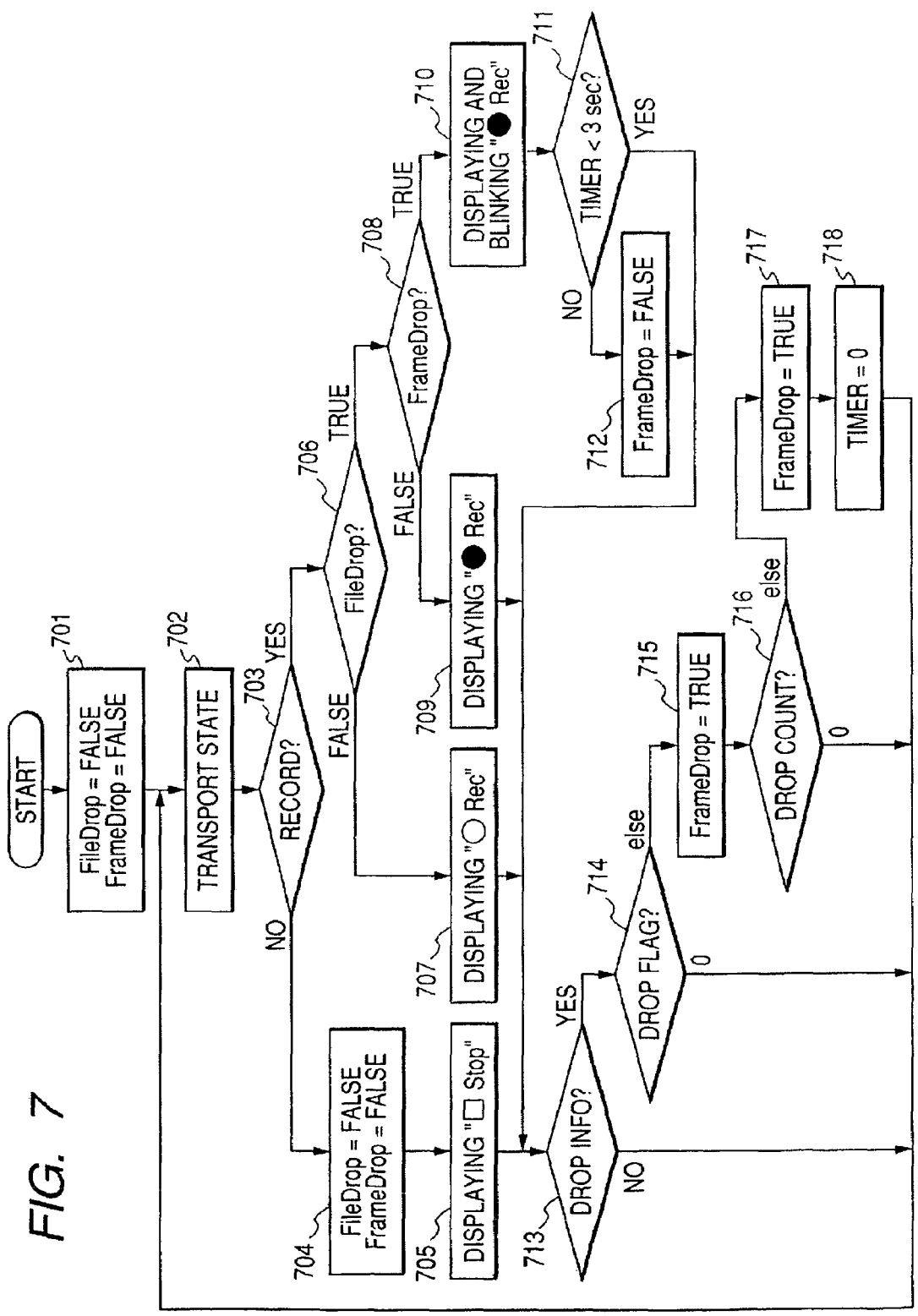
FIG. 7 is a flowchart showing a procedure for the image capture apparatus to display.

FIG. 7 is a flowchart showing an exemplary procedure of the image capture apparatus displaying the operation state of the image recording apparatus in the external device state indication segment of the display apparatus 505. When detecting an image recording apparatus, the image capture apparatus initializes each of FileDrop and FrameDrop to FALSE (step S701). FileDrop is a flag indicating whether or not a frame dropout has occurred in the file currently recorded onto the image recording apparatus connected to the image capture apparatus. FrameDrop is a flag indicating whether or not a frame dropout has occurred during a specific time period preceding to the present time.

Subsequently, a TRANSPORT STATE command for inquiring of the image recording apparatus the recording state is transmitted (step S702), and it is determined whether or not the response to the command is RECORD (indicating that recording is under way) (step S703).

If the response is not RECORD in step S703, this indicates that the image recording apparatus is not currently recording a video image, so FileDrop and FrameDrop are initialized to FALSE (step S704), and a blank square and "Stop" indicating that recording is not under way are displayed (step S705).

If the response is RECORD in step S703, this indicates that the image recording apparatus is currently recording a video image, so it is determined whether or not a frame dropout has occurred in the file currently recorded onto the image recording apparatus (step S706).

If the value of FileDrop is FALSE in step S706, this indicates that no frame dropout has occurred, so there are displayed a blank circle and "Rec" indicating that recording is under way and no frame dropout has occurred (step S707).

If the value of FileDrop is TRUE in step S706, this indicates that a frame dropout has occurred, so in this case, it is determined whether or not a frame dropout has occurred during a specific time period (3 seconds in the present embodiment) preceding to the present time (step S708).

If the value of FrameDrop is FALSE, this indicates that three or more seconds have passed since the previous frame dropout. Accordingly, there are displayed a solid circle and "Rec" indicating that recording is under way and a frame dropout has occurred three or more seconds before the present time (step S709).

If the value of FrameDrop is TRUE, this indicates that less than three seconds have passed since the previous frame dropout, so there are displayed and blinked a solid circle and "Rec" indicating that recording is under way and a frame dropout has recently occurred (step S710). Subsequently, it is determined based on the value of a timer described later which is reset at the time of detecting a frame dropout, whether or not three seconds have passed (step S711); if so, the value of FrameDrop is reset to FALSE (step S712).

In step S713, it is confirmed whether or not a DROP INFO command is received from the image recording apparatus. If so, the value of DROP FLAG field within the command frame is checked (step S714); if DROP FLAG field has a value other than "0", this indicates that a frame dropout has occurred in the file currently recorded onto the image recording apparatus, so the value of FileDrop is set to TRUE (step S715). If a frame dropout has occurred in the recording file, the value of DROP COUNT field within the command frame is checked (step S716). As described in the explanation of the operation of the image recording apparatus, when no frame dropout has occurred, a DROP INFO command is received, for example, at intervals of 30 seconds; when a frame dropout has occurred in the image recording apparatus, a DROP INFO command is received immediately after the occurrence. Accordingly, if DROP COUNT field has a value other than "0", this indicates that a frame dropout has occurred in the image recording apparatus immediately before receiving the command.

If it is detected in step S716 that DROP COUNT field has a value other than "0", the image capture apparatus sets to TRUE the value of FrameDrop which is a flag indicating whether or not a frame dropout has occurred during a specific time period (3 seconds in the present embodiment) preceding to the present time (step S717), and resets a timer for indicating the time has elapsed since a frame dropout is detected (step S718).

After completing the above procedure, the flow returns to step S702 and a similar process is repeated, whereby it is possible that when a frame dropout occurs in the image recording apparatus, a solid circle and "Rec" are displayed and blinked for 3 seconds to warn the photographer of the occurrence of a frame dropout, and after 3 seconds of blinking and displaying, the solid circle and "Rec" continues to be displayed to notify that a frame dropout has occurred in the file currently recorded. Once the recording of the file is completed, the above warning display returns to the normal one; each time a file is recorded, the recording state can be notified to the photographer.

Second Embodiment

Figure 8:
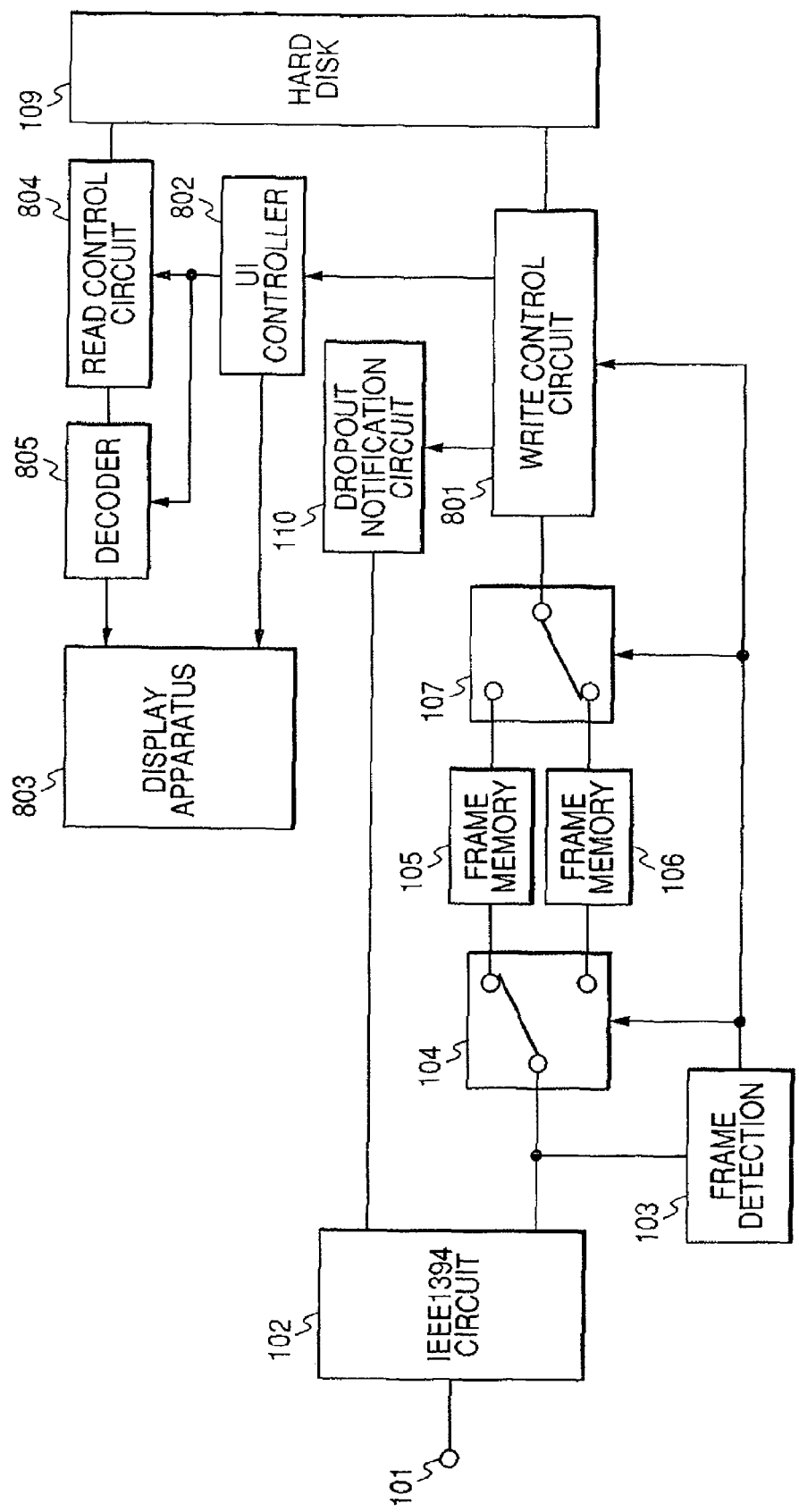
FIG. 8 is a block diagram showing a configuration of an image recording/reproducing apparatus according to a second embodiment.

FIG. 8 is a block diagram of a configuration of an image recording /reproduction apparatus according to a second embodiment of the present invention. Constituent elements denoted by the same reference numerals as those of FIG. 1 are identical with those described in connection with the first embodiment, and hence detailed explanation thereof is omitted here.

Similarly to the write control circuit 801 according to the first embodiment, a write control circuit 801 performs various controls for writing into a rear-stage hard disk 109 as a file, frame data stored in a frame memory 105 or a frame memory 106 connected via a switch 107. Each time a frame detection circuit 103 detects the starting data of a frame, a trigger signal is supplied to the write control circuit 801, and the write control circuit 801 counts up a counter included therein to hold what number of frame from to the start of writing the frame currently written is. When a trigger signal is received, the write control circuit 801 performs a processing of reading via the switch 107, frame data from a frame memory currently selected and writing it to the hard disk 109.

When the entire frame data stored in the frame memory cannot be written into the hard disk 109 by the time when a subsequent trigger signal is received after reception of a previous trigger signal (a "frame dropout"), the write control circuit 801 outputs a trigger signal to a dropout notification circuit 110.

The write control circuit 801 has a dropout occurrence flag and a dropout frame counter, and the values of the dropout occurrence flag and dropout frame counter are added to a trigger signal before the trigger signal is outputted. At the time when a recording file is created on the hard disk 109, the file name created is notified to a user interface (UI) controller 802, and the write control circuit 801 resets the dropout occurrence flag and dropout frame counter to "zero". When a frame dropout occurs during the writing of data into the file created on the hard disk 109, the write control circuit 801 sets the dropout occurrence flag to "1". Also, when a frame dropout occurs, the dropout frame counter is counted up by one. At the time when the write control circuit 801 outputs a trigger signal to the dropout notification circuit 110, the frame counter is reset to "zero".

The write control circuit 801 has a buffer for holding frame dropout information, which holds the frame numbers and the number of dropout frames in a file in which a frame dropout has occurred. At the time when a dropout occurs, the frame numbers and the number of dropout frames are notified to the UI controller 802. When completing the recording of the file onto the hard disk 109, the frame numbers and the number of dropout frames are recorded onto the header or footer area of the file as additional information which is buffer content dropout position information.

The UI controller 802 receives a file name created at the time when the write control circuit 801 creates the file, and displays the file name on a display apparatus 803. Similarly, when a frame dropout occurs, the UI controller 802 receives the frame numbers and the number of dropout frames in a file in which the frame dropout has occurred, from the write control circuit 801, and displays based on the received information the frame numbers and the number of dropout frames as frame dropout information related to the file name on the display apparatus 802.

Figure 9:
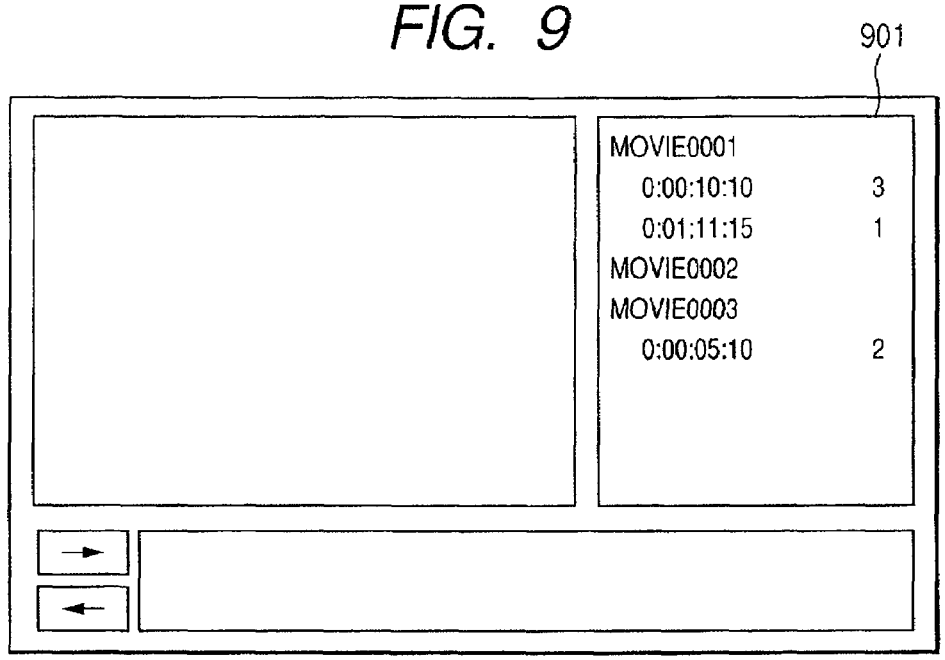
FIG. 9 is a view showing an exemplary display of frame dropout information of the image recording/reproducing apparatus according to the second embodiment.

FIG. 9 is an example in which file name and frame dropout information are displayed on the display apparatus 803. Reference numeral 901 denotes a display area for displaying file name and frame dropout information, where "MOVIE0001", "MOVIE0002" and "MOVIE0003" are file names. "0:00:10:10" displayed under "MOVIE0001" is data indicating, in the form of "hour:minute:second:frame", a position on the file where a frame dropout has occurred. "3" displayed to the right thereof is the number of dropout frames. From the data displayed in the display area 901, the user can recognize that in "MOVIE0001", 3 frame dropouts has occurred after the position "0:00:10:10", and one frame dropout has occurred after a position "0:01:11:15", and that no frame dropout has occurred in "MOVIE0002", and that in "MOVIE0003", 2 frame dropouts has occurred after a position "0:00:05:10".

Figure 10:
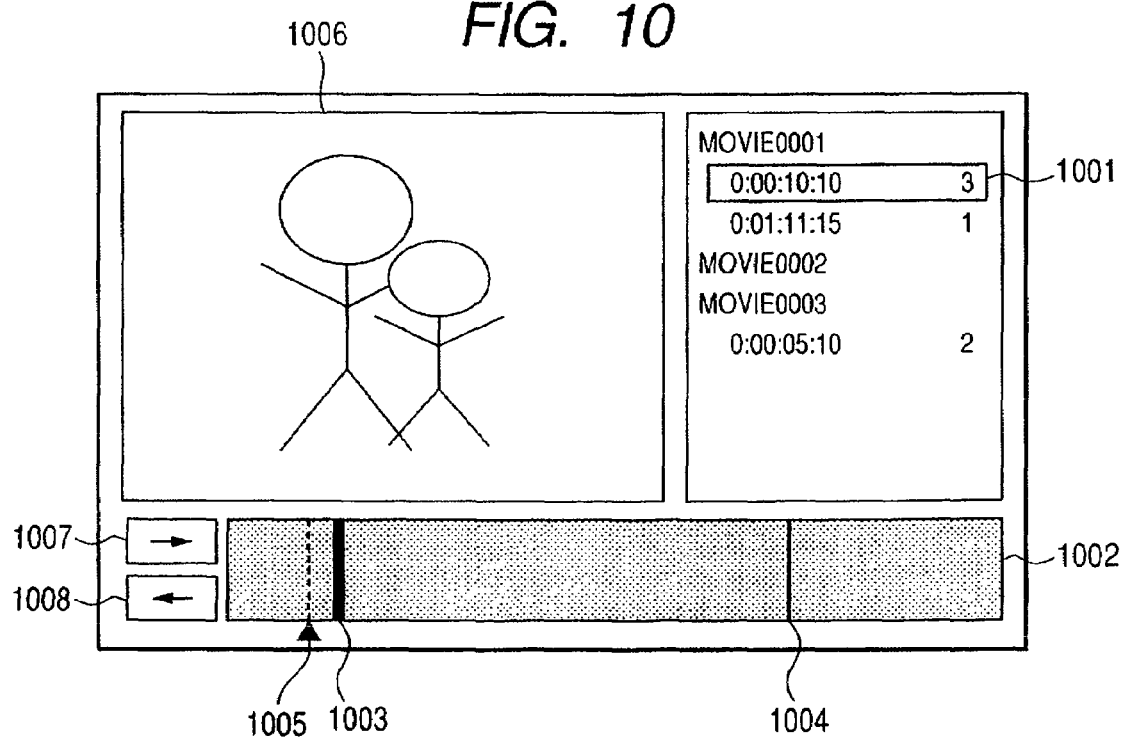
FIG. 10 is a view showing an exemplary display when frame dropout information is selected in the image recording/reproducing apparatus according to the second embodiment.

An operation button (not shown) is connected to the UI controller 802. By manipulating the operation button, the user can select frame dropout information displayed in the display area 901 as denoted by reference numeral 1001 in FIG. 10. FIG. 10 shows an exemplary display when frame dropout information is selected. When frame dropout information is selected by use of the operation button, the UI controller 802 controls a read control circuit 804 to open from the hard disk 109 a file "MOVIE0001" corresponding to the frame dropout information, retrieve header or footer information and read the length of video data recorded in the file and the frame dropout information.

The information thus read is outputted to the display apparatus 803 by the UI controller 802 and displayed as denoted by reference numeral 1002 in FIG. 10. The display 1002 indicates the entire length of the file, and reference numerals 1003 and 1004 each denote a frame dropout position in the file. In the frame dropout position displays 1003 and 1004, the thickness varies according to the number of dropout frames at the respective positions. The display 1003 corresponds to the selected frame dropout information 1001, and the display 1004 corresponds to the position "0:01:11:15" displayed under the selected frame dropout information 1001.

Also, the UI controller 802 controls the read control circuit 804 to read from the hard disk 109 an image corresponding to the selected frame dropout position 1001, for example, one second before the frame dropout position, supplies the read image to a decoder 805 to decode it, and displays the resultant image on the display apparatus 803. The decoded image is displayed in a preview display section 1006. In the display 1002, as indicated by reference numeral 1005 in FIG. 10, a position in the image file currently displayed is represented under the display 1002 by a triangle and represented inside the display 1002 by a broken line.

Under this condition, when the operation button is operated or the triangle is moved, for example, by a device such as a mouse, the UI controller 802 controls the read control circuit 804 and the decoder 805 to allow for performing a file reproduction processing and a search processing.

Reference numeral 1007 in FIG. 10 denotes a button for moving from the current reproduction position to the subsequent frame dropout position, and reference numeral 1008 denotes a button for moving to the previous frame dropout position. For example, when the triangle and the broken line 1005 are positioned between the displays 1003 and 1004, if the button 1007 is clicked by a mouse or the like, the triangle and the broken line 1005 moves to a position one second before the display 1004, and if the button 1008 is clicked, the triangle and the broken line 1005 moves to a position one second before the display 1003. Then the UI controller 802 controls the read control circuit 804 and the decoder 805 to initiate a file reproduction/display from the above position.

In this way, frame dropout information displayed in the display apparatus 803 is selected to perform the reproduction control, whereby the image in the vicinity of a dropout position can easily be confirmed, and the user can determine whether or not a desired part is absent.

It will easily be appreciated that the object of the present invention is also achieved by supplying a storage medium having stored therein software program codes for realizing the functions of the above described embodiment to a system or an apparatus, and causing a computer (alternatively a CPU or an MPU) of the system or apparatus to read and execute the program codes stored in the storage medium.

In this case, the program codes read from the storage medium realize the functions of the above-described embodiment by themselves. Accordingly, each one of the program codes and the storage medium having stored therein the program codes are one aspect of the present invention.

As the storage medium for supplying the program codes, a flexible disk, a hard disk, an optical disk, a magneto optical disk, a CD-ROM, a CD-R, a magnetic tape, a nonvolatile memory card, a ROM or the like can be used, for example.

It will easily be appreciated that the functions of the above-described embodiment are realized not only when the readout program codes are executed by the computer but also when the OS (base system or operating system) or the like running on the computer performs part or all of actual processing based on the instructions of the program codes.

It will easily be appreciated that functions of the above-described embodiment are also realized when the program codes read from the storage medium are written into the memory of a function expansion board inserted into the computer or a function expansion unit connected to the computer, and then the CPU or the like included in the function expansion board or function expansion unit performs part or all of actual processing based on the instructions of the program codes.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims priority from Japanese Patent Application No. 2004-381605 filed on Dec. 28, 2004, which is hereby incorporated by reference herein.

What is claimed is:

1. An image capture apparatus that transmits moving image data to an external recording apparatus, comprising:

a communication unit that receives frame dropout information from the external recording apparatus, wherein frame dropout information includes first information and second information, the first information indicates that a frame dropout is occurred in the external recording apparatus when the external recording apparatus is recording the moving image data on a recording medium, and the second information indicates the number of the dropout frames counted by the external recording apparatus;

a determination unit that determines, based on the frame dropout information, whether the frame dropout is occurred in the external recording apparatus; and a display unit that (a) displays first display information indicating that the external recording apparatus is recording the moving image data and the frame dropout is not occurred in the external recording apparatus, if the determination unit determines that the frame dropout is not occurred in the external recording apparatus, and (b) displays second display information indicating that the external recording apparatus is recording the moving image data and the frame dropout is occurred in the external recording apparatus, if the determination unit determines that the frame dropout is occurred in the external recording apparatus.

2. The image capture apparatus according to claim 1, wherein the communication unit transmits the moving image data to the external recording apparatus.

3. A method of controlling an image capture apparatus that transmits moving image data to an external recording apparatus, the method comprising the steps of:
 receiving frame dropout information from the external recording apparatus via a communication unit, wherein frame dropout information includes first information and second information, the first information indicates that a frame dropout is occurred in the external recording apparatus when the external recording apparatus is recording the moving image data on a recording medium, and the second information indicates the number of the dropout frames counted by the external recording apparatus;
 determining, based on the frame dropout information, whether the frame dropout is occurred in the external recording apparatus;
 displaying first display information indicating that the external recording apparatus is recording the moving image data and the frame dropout is not occurred in the external recording apparatus, if it is determined in the determining step that the frame dropout is not occurred in the external recording apparatus; and
 displaying second display information indicating that the external recording apparatus is recording the moving image data and the frame dropout is occurred in the external recording apparatus, if it is determined in the determining step that the frame dropout is occurred in the external recording apparatus.

4. The method according to claim 3, wherein the moving image data is transmitted to the external recording apparatus via the communication unit.

* * * * *